(12) United States Patent
Johnson et al.

(10) Patent No.: US 6,782,239 B2
(45) Date of Patent: Aug. 24, 2004

(54) WIRELESS OUTPUT INPUT DEVICE PLAYER

(75) Inventors: Timothy Michael Johnson, Algonquin, IL (US); Joseph Born, Lincolnwood, IL (US)

(73) Assignee: Neuros Audio L.L.C., Chicago, IL (US)

( * ) Notice: Subject to any disclaimer, the term of this patent is extended or adjusted under 35 U.S.C. 154(b) by 48 days.

(21) Appl. No.: 10/177,127

(22) Filed: Jun. 21, 2002

(65) Prior Publication Data

US 2003/0236075 A1 Dec. 25, 2003

(51) Int. Cl.[7] .............................................. H04H 1/04
(52) U.S. Cl. ........................ 455/42; 455/67.11; 381/3
(58) Field of Search ....................... 455/42, 66.1, 67.11, 455/99, 345; 381/1–6

(56) References Cited

U.S. PATENT DOCUMENTS

| | | | | |
|---|---|---|---|---|
| 4,493,099 A | * | 1/1985 | Schmidt | 381/14 |
| 4,712,250 A | | 12/1987 | Michels et al. | 455/20 |
| 5,036,543 A | * | 7/1991 | Ueno | 381/13 |
| 5,293,633 A | * | 3/1994 | Robbins | 725/144 |
| 5,319,716 A | * | 6/1994 | McGreevy | 381/79 |
| 5,408,686 A | | 4/1995 | Mankovitz | 455/66.1 |
| 5,628,056 A | * | 5/1997 | Grysiewicz et al. | 455/89 |
| 5,768,345 A | * | 6/1998 | Takebe et al. | 379/61 |
| 5,842,119 A | * | 11/1998 | Emerson et al. | 455/161.3 |
| 5,905,947 A | | 5/1999 | Stein | 455/90.1 |
| 5,911,118 A | * | 6/1999 | Morris et al. | 455/156.1 |
| 5,946,604 A | * | 8/1999 | Bailey | 455/42 |
| 5,970,390 A | * | 10/1999 | Koga et al. | 455/42 |
| 5,991,622 A | | 11/1999 | Henry, Jr. | 455/434 |
| 6,163,711 A | | 12/2000 | Juntunen et al. | |
| 6,423,892 B1 | * | 7/2002 | Ramaswamy | 84/609 |
| 6,556,813 B2 | * | 4/2003 | Tsui | 455/92 |
| 6,608,399 B2 | * | 8/2003 | McConnell et al. | 307/10.1 |

* cited by examiner

Primary Examiner—Edward F. Urban
Assistant Examiner—Blane J. Jackson
(74) Attorney, Agent, or Firm—Lloyd L. Zickert

(57) ABSTRACT

A wireless output input device (WOID) digital audio player for storing and/or receiving digital audio and preserving the digital stream without the inherent distortion of translating the stream to analog prior to modulation and transmission, which includes an FM receiver, and an FM transmitter for transmitting the audio to an external FM radio or receiver. The device automatically and periodically scans a plurality of channels on the FM band to determine the channel having the least amount of interference and then tunes the FM transmitter to the frequency of that channel and displays the channel to which the external receiver should be tuned. A remote control may be provided to selectively transmit signals to the player's FM receiver for controlling operation of the player.

20 Claims, 9 Drawing Sheets

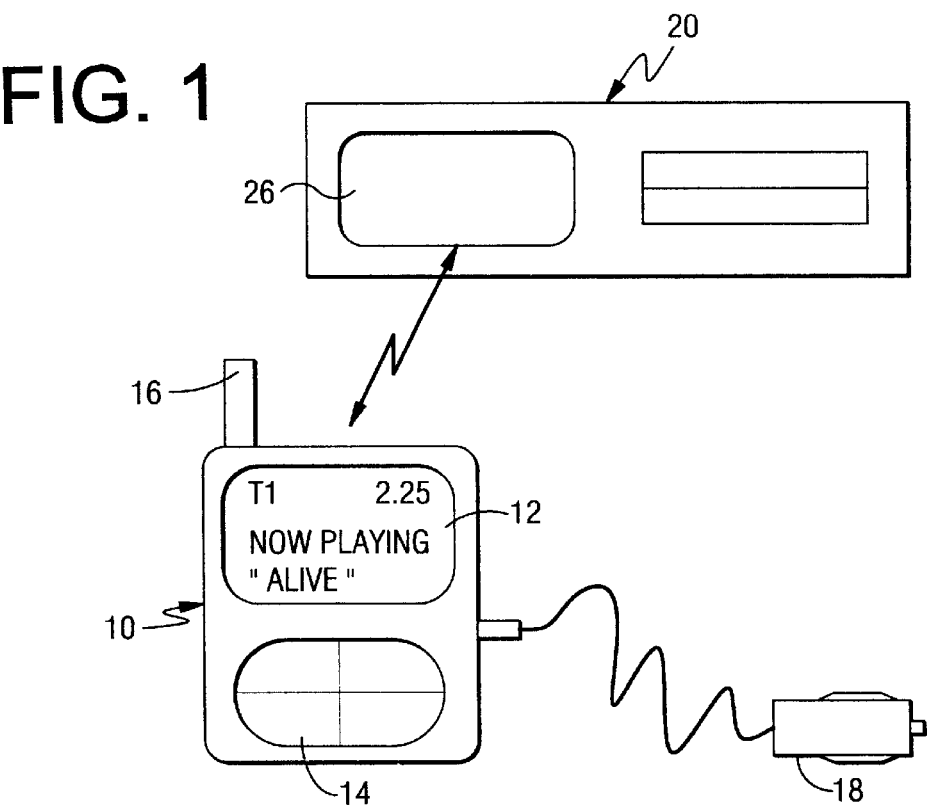
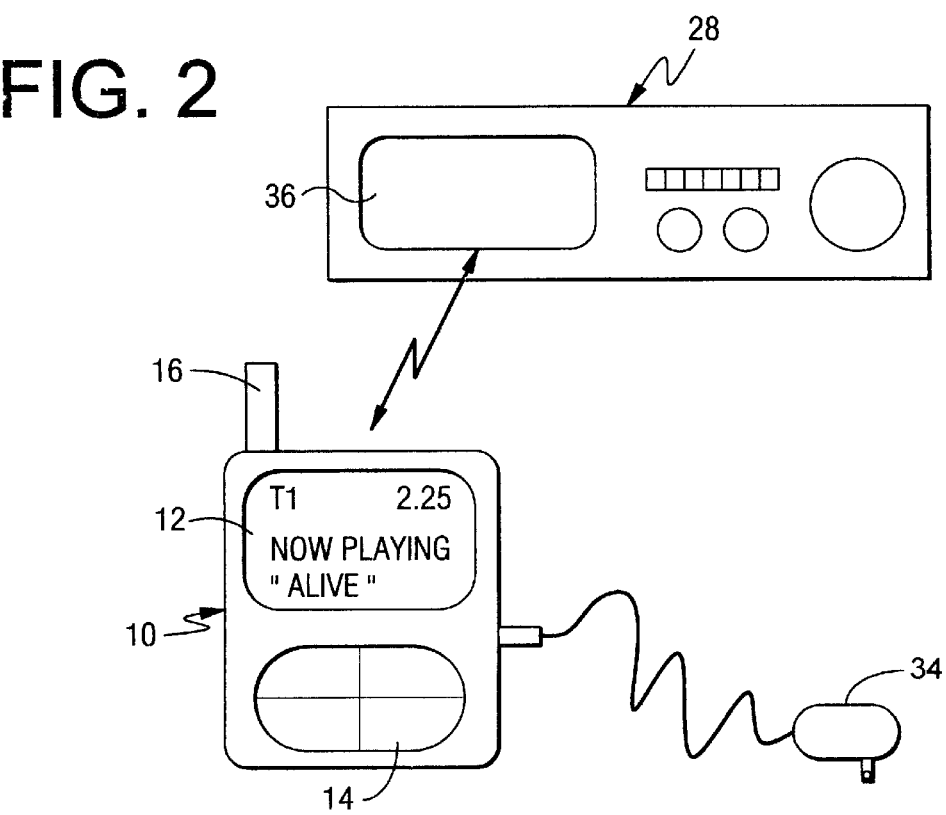

FIG. 7 STEREO ENCODER WITH AUDIO TAKEN FROM INPUT TO CODEC

FIG. 9  AUTO-NOISE REDUCTION BY ENCODER MODE SWITCHING

CHANNEL INTERFERENCE PROFILE FLOWCHART

MACRO LEVEL FLOWCHART FOR AUTO-SCAN

WIRELESS OUTPUT INPUT DEVICE PLAYER

This invention relates in general to a digital audio player, and more particularly to a wireless output input device player for relaying a digitally encoded stream of audio to a mobile, stationary or portable FM receiver.

BACKGROUND OF THE INVENTION

Heretofore, it has been known to provide a portable CD or MP3 player for wireless playback on an FM stereo receiver or radio. Of those products known, the Z-Wave FM transmitter and Sound feeder FM transmitter can be tuned to the entire FM band using a single dial-controlled variable capacitor or in conjunction with a band selector switch. These products use a simple L–C oscillator for generating a carrier signal and are therefore prone to temperature drift, pulling due to magnetic fields, or simply bad phase noise. Another product, the Link-it transmitter, includes a channel switch for choosing between one of five channels. These products utilize standard and inferior off-the-shelf stereo encoders.

It is also known that a portable CD player distributed by Brookstone, Inc. includes an integrated FM transmitter tunable to any FM frequency by a dial-controlled variable capacitor.

Except for the Link-it product, the above products do not indicate the channel on which they are transmitting, and therefore the FM receiver must be tuned to locate the channel. This presents difficulties in use of the products, because a user will manually need to adjust the FM receiver to adapt to the signal being transmitted by the product transmitter. Also, since the selector of the channel is subject to being bumped or moved and the transmitter is subject to drifting, the transmitting channel may not be identical from one moment to another and may thus require readjusting the receiver. Further, inasmuch as the FM transmitter's power output is purposely maintained low to prevent interference with other nearby radio listeners and regulatory restrictions, it is possible to tune the transmitter to a channel that is on or very close to a strong local channel, thereby masking the FM transmitter's signal and preventing it from being found on the receiver.

It has also been known to provide an FM transmitter for converting an audio signal into an FM signal for transmission, that includes a circuit for detecting an unused FM frequency to set the transmitter to the detected unused frequency and display that frequency as disclosed in U.S. Pat. No. 5,970,390.

SUMMARY OF THE INVENTION

The problems heretofore found in wireless players are addressed by the wireless output input device (WOID) player of the present invention, particularly by providing a frequency synthesized FM transmitter and FM receiver integral with the player. By using a frequency synthesizer, the player can be completely microprocessor controlled. It should be appreciated that while the present disclosure is directed toward FM frequency, any other suitable frequency and modulation schemes could also be supported.

The FM transmitter of the WOID player of the present invention may be limited to producing signals on a discrete number of channels or it may have the ability to tune any channel within the FM band.

Once the FM transmitter functionality of the WOID player of the present invention is turned on, the transmitter automatically scans the FM band for the presence of other strong signals and determines the channel with the least amount of interference and automatically tunes the FM transmitter of the player to that channel. A display then indicates the frequency of the channel on which the player will be transmitting so that the FM receiver intended to receive the digital signal output of the player can be tuned to that channel.

When searching for a channel, if the FM transmitter of the WOID player of the invention is restricted to a number of discrete channels such as 15 channels distributed across the band, only those 15 channels will be searched to determine which channel has the least amount of interference. However, it will be appreciated that if the FM transmitter of the player is not limited to a discrete number of channels, a profile of the entire band will be generated by the player for searching.

Since the WOID player of the invention is particularly suited to be used in an automobile, it will be appreciated that a chosen FM channel may suffer from interference such as when going from one geographic area to another. While the user may manually request another channel, the player of the invention may be programmed to periodically monitor the interference level on the current channel and other channels by monitoring and estimating the signal to noise ratio (SNR) of the received audio. This ratio is explained herein to constitute the peak signal value to energy value ratio as a method used to estimate SNR. Should the SNR commence degrading, the search process for a channel of least interference may be automatically started, and when found, the player can cue the user to change the channel on the mobile or stationary FM receiver. Alternatively, the player may be programmed to continuously monitor the other possible transmission channels to see if another channel would be better than the current channel. Another alternative is to provide a built-in microphone of the player to monitor the audio output of the receiver for the presence of static or other interference present in the transmission, and if found, to then seek a better channel. Further, the device can overcome a degraded stereo FM broadcast by converting the signal from a stereo FM broadcast to an monaural FM broadcast. The device will do this because monaural FM broadcasting offers better SNR than stereo FM broadcasting. When the microphone and/or receiver detects that the stereo signal has degraded and a mono FM signal would provide a better signal to noise ratio, the player would automatically convert to monaural broadcasting without user intervention and prior to being switched automatically by the receiving radio.

Where a better station is found for transmission, the WOID player would send an audio and/or visual cue notifying the user to change channels to that indicated either in the display or audibly announced by a voice synthesizer or the like. The player would then listen via the microphone for the absence of a signal tone from the FM receiver to determine when the user had taken the recommendation to change the frequency of the FM receiver. Once the player has determined that the user has changed the receiver channel, the FM transmitter on the player would then automatically switch to the indicated channel. Accordingly, the player would allow the user to receive clear audio even when driving through long congested areas or over long distances while merely requiring the user to switch receiver channels in response to an audible tone or a visual cue. It would never be necessary to manipulate the device in this process.

It is therefore an object of the present invention to provide a WOID player for transmitting a digitally encoded stream of audio from a digital audio player to an FM receiver that produces high fidelity.

Another object of this invention is in the provision of a WOID player including an FM transmitter and an FM tuner which shares the digital processing power of the device's CPU to perform digital stereo encoding, thereby maintaining the cost of the player at a low level because of the ability to use components already existing on the player.

A further object of the present invention is to provide a WOID player for transmitting digitally stored audio and which also includes an FM receiver that is used in conjunction with an auto scanning feature to determine an FM channel having the least amount of interference.

Another object of the present invention is to provide a WOID player having an all-digital stereo encoder, thereby making it possible to implement other forms of digital communications over the FM band.

Yet another object of the present invention is to provide a WOID player having a stereo encoder that accepts audio inputs from an outside source, and is capable of retransmitting that audio.

A further object of the invention is to provide a WOID player which implements other forms of digital communications over the FM band which will allow the creation of an inexpensive means to remotely (wirelessly) control or operate the player.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a block diagram illustrating the overall concept of the WOID player of the present invention when used with a mobile FM receiver;

FIG. 2 is a block diagram like FIG. 1 illustrating the use of the WOID player of the present invention as used with a stationary FM receiver;

DESCRIPTION OF THE INVENTION

Figure 3:
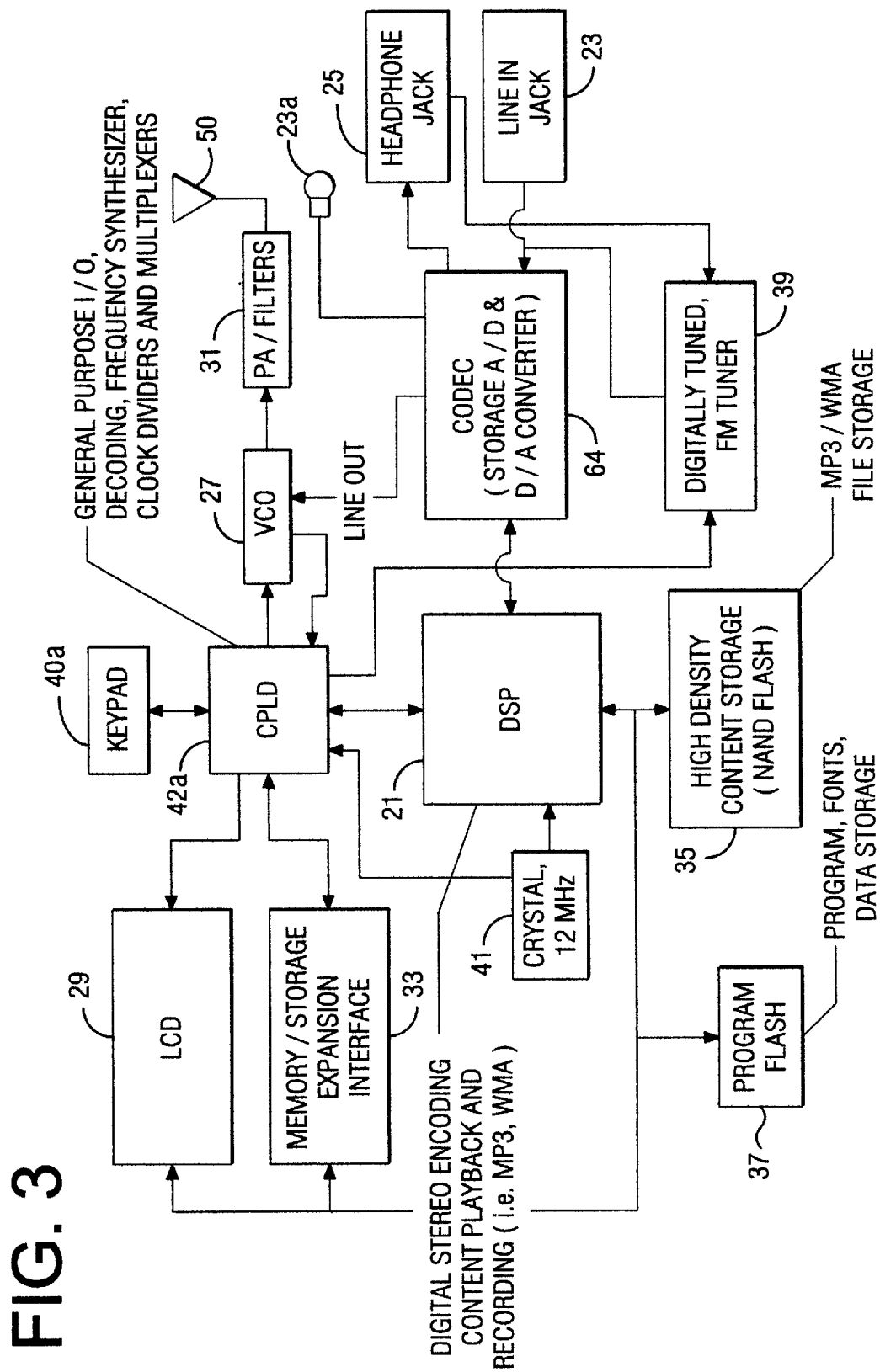
FIG. 3 is a block diagram of the WOID player of the present invention.

While the invention is susceptible of being in many different forms, there will be described herein in detail, preferred and alternate embodiments of the present invention. It should be understood, however, that the present disclosure is to be considered an exemplification of the principles of the invention and is not intended to limit the spirit and scope of the invention and/or claims of the embodiments illustrated.

The description uses a number of acronyms that are generally well known. Even though definitions are typically provided for each acronym used, the following glossary provides a list and the definitions.

| Glossary | |
|---|---|
| CD | compact disc |
| CODEC | coder/decoder |
| CPLD | complex programmable logic device |
| CPU | central processor unit |
| CW carrier | continuous wave carrier |
| dB | decibel |
| DSP | digital signal processor |
| DTMF signal | dual tone multiple frequency signaling |
| FM | frequency modulation |
| fs | sample rate |
| ksps | kilo-samples per second (sampling rate) |
| kHz | kilohertz |
| L | left channel of stereo transmission |
| LCD | liquid crystal display |
| LPF | low pass filter |
| Mbps | megabits per second |
| Mhz | megahertz |
| MIPS | millions of instructions per second |
| MP3 | moving picture expert group layer 3 compressed audio format |
| MPX | multiplexing |
| Msps | mega-samples per second (sampling rate) |
| PA | power amplifier |
| PAM carrier | pulse amplitude modulated carrier |
| PLL | phase locked loop circuit |
| R | right channel of stereo transmission |
| RBDS | Radio Broadcast Data System |
| RDS | radio data system (capable radio receivers) |
| RF | radio frequency |
| RSSI | received signal strength indicator |
| SNR | signal to noise ratio |
| TDMA | time division multiple access |
| VCO | voltage controlled oscillator |
| $\mu V/m$ | microvolts per meter |
| WMA | Windows Media Audio (competitor to MP3) |
| WOID | wireless output input device |

The wireless output input device (WOID) player of the invention may be used for transmitting an RF signal to a specifically tuned receiver that may be mobile, portable, or stationary. Preferably the WOID player of the invention is used with an FM receiver or radio for the purpose of relaying a digital output of audio from the player to the FM receiver. The WOID player will be described for operation on the FM spectrum, although it could be used on any radio spectrum suitable for wireless broadcasting and/or communications.

The player includes an FM transmitter preferably sharing the digital processing power of the player's central processor unit (CPU) to digitally encode the stored data, resulting in a lower cost per unit. Moreover, the player of the invention preserves the digital stream without incurring the inherent distortion of translating the stream to analog prior to stereo modulation, and provides for superior modulation characteristics compared with normally used off-the-shelf analog stereo encoders.

Referring now to the drawings, and particularly to FIG. 1, the WOID player of the present invention, generally indicated by the numeral 10, is diagrammatically shown in a housing including a display 12 and a control panel 14. It will be appreciated that the display may be of any suitable type, such as a liquid crystal display (LCD). With respect to the control panel 14, it may also be of any type that will be suitable for operating the player, including a keypad unit, as will be more clearly described below. A suitable antenna 16 may extend from the housing of the player and will serve as the antenna not only for the FM transmitter but also for the FM receiver in accordance with the description below. This antenna may also be embedded in the WOID player or alternatively be externally connected through a standard jack and plug connection.

When used in a mobile environment such as in a vehicle, power may be supplied to the player through the power of the vehicle by connecting the cigarette lighter adapter 18 of the player to a cigarette lighter or power socket of the vehicle. Of course, it should be appreciated that battery power could be used to drive the player when power from a vehicle is not available. The portable WOID player is wireless and can relay digitally synthesized radio frequency signals to a mobile FM radio or receiver 20. A digital readout display 26 is provided on the receiver 20 and also may be of a LCD type. The operation of the WOID player will be more specifically described hereafter.

Referring now to FIG. 2, the same WOID player 10 is shown as it would be used in connection with a stationary FM receiver 28, wherein the data from the player may be transmitted to the receiver by the FM transmitter of the player through the broadcast FM band. An AC/DC wall adapter 34 is shown for powering the player although, as indicated above, the player may be powered by battery if desired. By using household power or that of an automobile, any integrated rechargeable batteries are not used and will be charged. The stationary receiver likewise includes a display 36 such as of the LCD type. The multiple use capability of the portable digital wireless output input device player of the invention therefore can be readily understood after viewing the block diagrams shown in FIGS. 1 and 2.

While not shown, the WOID player could be operated under battery power with a portable battery operated radio.

Headphones can be connected to the player through a suitable jack for receiving the audio output of the player when not in proximity with another FM radio or whenever headphone use is otherwise desired.

It will be appreciated that although the player of the present invention does include an FM receiver or tuner, it is not likely to be used in lieu of the typically better performing receivers of a vehicle radio or a stationary receiver in a home entertainment center. As a result, it is unlikely that the FM receiver and transmitter will be used simultaneously, and thus it should be appreciated that the FM receiver of the WOID player may be used as part of a wireless remote control system that includes a remote unit used to control volume, select play lists and songs. Since the player will normally be powered from a cigarette lighter adapter or a wall AC/DC adapter, the additional power needed for running the FM tuner would be unimportant.

FIG. 3 illustrates the interaction of the systems in the player. Central in this output/input player is the DSP, or digital signal processor 21. The DSP 21 is connected to all essential elements needed for audio signal transmission and storage of audio. The DSP 21 controls digital stereo encoding, content playback and recording of digital mediums, such as MP3s and WMAs. The DSP 21 is also responsible for detection of energy strength, and the auto-scan feature which is further described below. The DSP 21 is connected to the coder/decoder CODEC 64 which controls stereo and other audio input conversion to encoded form. The CODEC 64 can receive the audio input from a variety of different sources including a line In jack 23, which provides digital audio medium from an outside source. A microphone 23a is usable to feed a tone into the CODEC that would include a suitable microphone preamplifier. The WOID player can be set by the keypad to receive audio for storage, or for direct play such as from a CD player. The CODEC 64 also receives its audio from the DSP 21, which may contain digital stereo data from an MP3 format or other storage system. The CODEC then can feed an analog signal out to a headphone jack 25 for private use, or the signal can be fed to the voltage controlled oscillator (VCO) 27 for FM transmission as described below. The VCO 27 is modulated by the analog signal coming from the CODEC that was digitally created by the DSP 21, and helps to form a PLL with the CPLD 42A to eliminate drift, susceptibility to electromagnetic radiation and to provide digital frequency synthesis. It will also be appreciated that the digitally created signal can also be used for forms of digital communications, which will allow the transmitting of digital data over the FM band. The output of the VCO 27 is fed to the power amplifiers or filters 31, which in turn amplifies the signal for FM transmission through the players internal or external antenna 50. While not shown, a jack may be provided and connected to the antenna 50 for optionally connecting an external antenna for some applications. In addition to integrating the PLL, the CPLD 42A will be programmed to provide the remainder interface functionality between the DSP 21 and the peripherals. The CPLD 42A is directly linked to the keypad 40A. The CPLD 42A can be observed and controlled by the remote panel 40A, and by an LCD display 29. The CPLD 42A also interfaces wit a memory storage expansion interface unit 33 and the DSP 21. It will be appreciated that the CPLD 42A, the VCO 27, and the CODEC 64 coact as the FM transmitter.

As also illustrated in FIG. 3, the player has a storage area for inputted audio or digital data coming in or being encoded/decoded by the player. This high density content storage 35, stores MP3 and WMA files for later use by the player system. This high density storage 35 is accessible by the DSP 21 for signal processing and encoding before being fed for transmission. The player also contains additional data storage space 37. This additional storage space 37 can be used to house program data information, fonts and additional audio/digital content if needed.

Also illustrated in FIG. 3, is the player's internal digitally tuned, FM tuner 39. The tuner 39 can be used independent of the players' other functions as a stand alone unit. Alternatively it can be used by the player's CPLD 42 to synthesize frequencies or to monitor FM transmission and interference.

Figure 4:
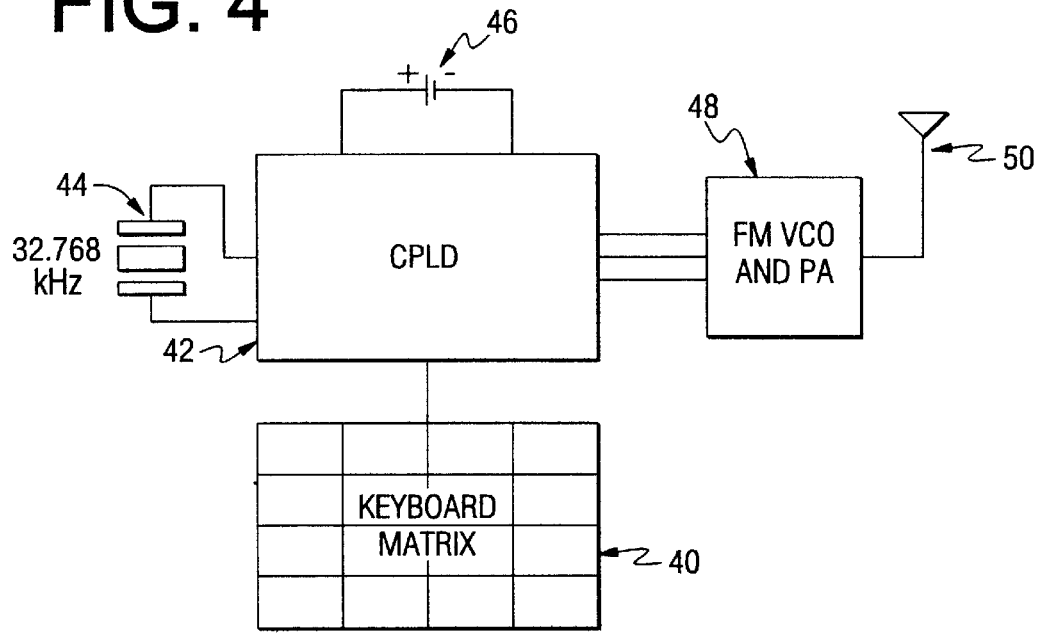
FIG. 4 is a block diagram of the remote control for wirelessly controlling the player according to the present invention.

The various functions of the player may also be wirelessly controlled by the remote control shown in FIG. 4 using dual tone frequency signaling (DTMF) through a keyboard control panel 40.

The following Table A illustrates how various functions of the player could be controlled using DTMF wherein eight orthogonal tones represent four rows and columns on the keyboard panel. When pressing a key on the panel of the remote control, the two tones designated by the row and column of that key are generated and added together. Normally, the higher frequency would be at least one dB above the lower in typical telecommunications signaling, and since the WOID player contains DSP, decoding DTMF is relatively straightforward and simple.

TABLE A

| Frequency | 1209 | 1336 | 1477 | 1633 |
|---|---|---|---|---|
| 697 | Play | Pause | Stop | FF |
| 770 | Rewind | Track Up | Track Down | Mute |
| 852 | HiSi | Volume Up | Volume Down | Reserved |
| 941 | Reserved | Reserved | Reserved | Reserved |

Using the above method of control allows use of off-the-shelf DTMF generators along with a basic microcontroller, VCO, and frequency synthesizer.

A more economical method of control would include utilizing two off-the-shelf low-cost oscillators or tone generators, such as an industry standard general purpose timer/oscillator. Controlling the tone of these oscillators can be accomplished either by selectively changing the capacitance or the resistance of the timing circuit with the output of one oscillator controlling the operation of a second oscillator. This method is illustrated in the following Table B.

TABLE B

| Frequency | 10 | 100 | 200 | 300 |
|---|---|---|---|---|
| 10 Tone | Play | Pause | Stop | FF |
| 100 Tone | Rewind | Track Up | Track Down | Mute |
| 1000 Tone | HiSi | Volume Up | Volume Down | Reserved |
| 10000 Tone | Reserved | Reserved | Reserved | Reserved |

The output of this method can then be filtered and sent directly into the transmitter circuit 48 of the remote control.

The FM transmitter utilized in the remote control of the invention may be a simple L-C (or crystal) oscillator with a voltage controlled capacitor to provide modulation. Alternatively, the FM transmitter could be frequency synthesized utilizing a phased lock loop circuit (PLL).

When using an L-C oscillator for the FM transmitter, frequency stability can be controlled inasmuch as the FM tuner in the player would have the ability to track the frequency changes. In this respect, the FM tuner or receiver of the player would be programmed to periodically wake up and transmit a single tone for a fraction of a second to automatically track frequency drifts.

While it should be appreciated that a crystal oscillator could also be used, such would be more costly and multiple frequency outputs would be difficult to produce inexpensively as the cost would increase with each new crystal added.

In the embodiment of FIG. 4, the keyboard panel 40 of the remote control therefore controls the low powered complex programmable logic device 42 (CPLD) which is driven by a 32.768 kHz watch crystal 44 that provides periodic wake-up and transmit functions. All modulation frequencies are derived from the CPLD 42. A battery 46 powers the CPLD, although a suitable adapter could be provided to power it through a vehicle's power or household power.

An FM voltage controlled oscillator (VCO) 48 and power amplifier is phase-locked through a PLL to the reference crystal 44 and the output is delivered to an embedded whip antenna 50.

Figure 5:
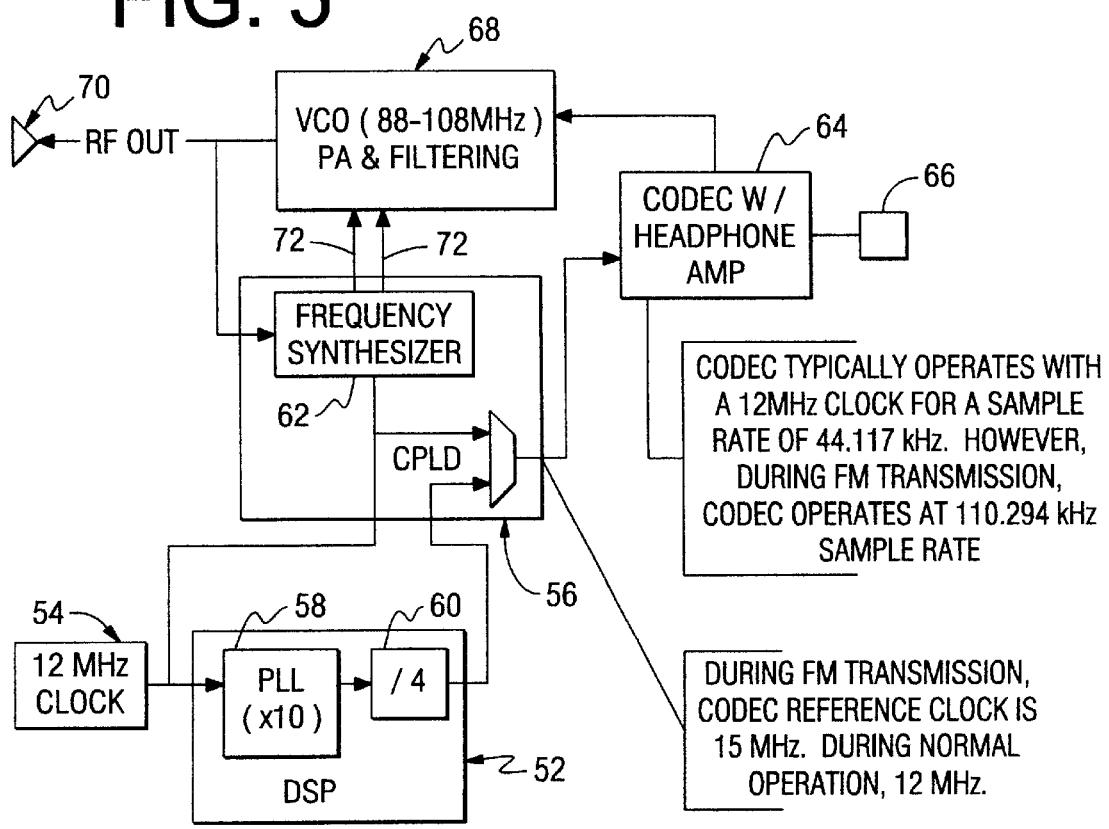
FIG. 5 is a block diagram of the player of the present invention illustrating the integration of the digital audio player and the FM transmitter and illustrating the sample rates and clock rates.

Referring now to FIG. 5, a block diagram of the WOID player shows the integration of the digital audio player and the FM transmitter, and illustrates the sampling rate scheme and the clock rate scheme, wherein the digital signal processor (DSP) 52 of the WOID player shown in FIG. 5 is driven by a 12 MHz system clock 54, which also drives the CPLD 56. The capacity of the DSP 52 provides for adequate processor power for digital audio decoding and stereo MPX signal generation. The DSP 52 includes an integrated phase locked loop circuit (PLL) 58 and a controllable clock output 60 which can be set to divide by 1, 2, 3, or 4 of the system clock.

The CPLD 56 implements the frequency synthesizer 62, although it should be appreciated that a separate dedicated PLL 58 could also be used. The synthesizer 62 provides a means for digitally setting and maintaining a transmission channel regardless of drifting that may be caused by numerous means.

The clock of the CODEC 64 is determined by the CPLD 56 and can either be selected as the 12 MHz system clock or derived from the internal DSP 52 clock. The digital output of the CPLD 56 is fed into the CODEC 64 for conversion to an analog signal for FM transmission.

The output of the CODEC 64 then feeds to the VCO or FM modulator 68 and to the antenna 70 for transmission. During FM transmission the reference clock for the coder decoder 64 is 15 MHz. During normal operation the reference clock stays at 12 MHz for a sample rate of 44.117 kHz while during FM transmission the CODEC operates at 110.294 kHz sampling rate.

Changing the frequency of transmission for the FM transmitter 68 is controlled by the frequency synthesizer through up and down signal lines 72. Thus, the VCO and FM modulator 68 serve to provide the RF output to the antenna 70 for the FM transmission. Integral with the VCO and FM modulator 68 is a filtering circuit to provide the necessary filtering and impedance matching for the antenna 70. The RF output is fed back to the frequency synthesizer 62 to be checked, and in the event the frequency is incorrect, the synthesizer 62 will make the necessary adjustment.

It may further be appreciated that the digital filtering in the stereo encoder and the oversampling rate of modulator 68 eliminates variations in frequency response and helps to eliminate harmonic generation in the modulator that could spoil channel separation or frequency response for a channel, thus preserving audio fidelity.

The use of an audio pre-emphasis filter in the WOID player of the invention reduces noise in stereo transmissions and such a filter can be more precise and unaffected by manufacturing variance, thereby more precisely controlling transmitter fidelity over the typical analog pre-emphasis filters.

Figure 6:
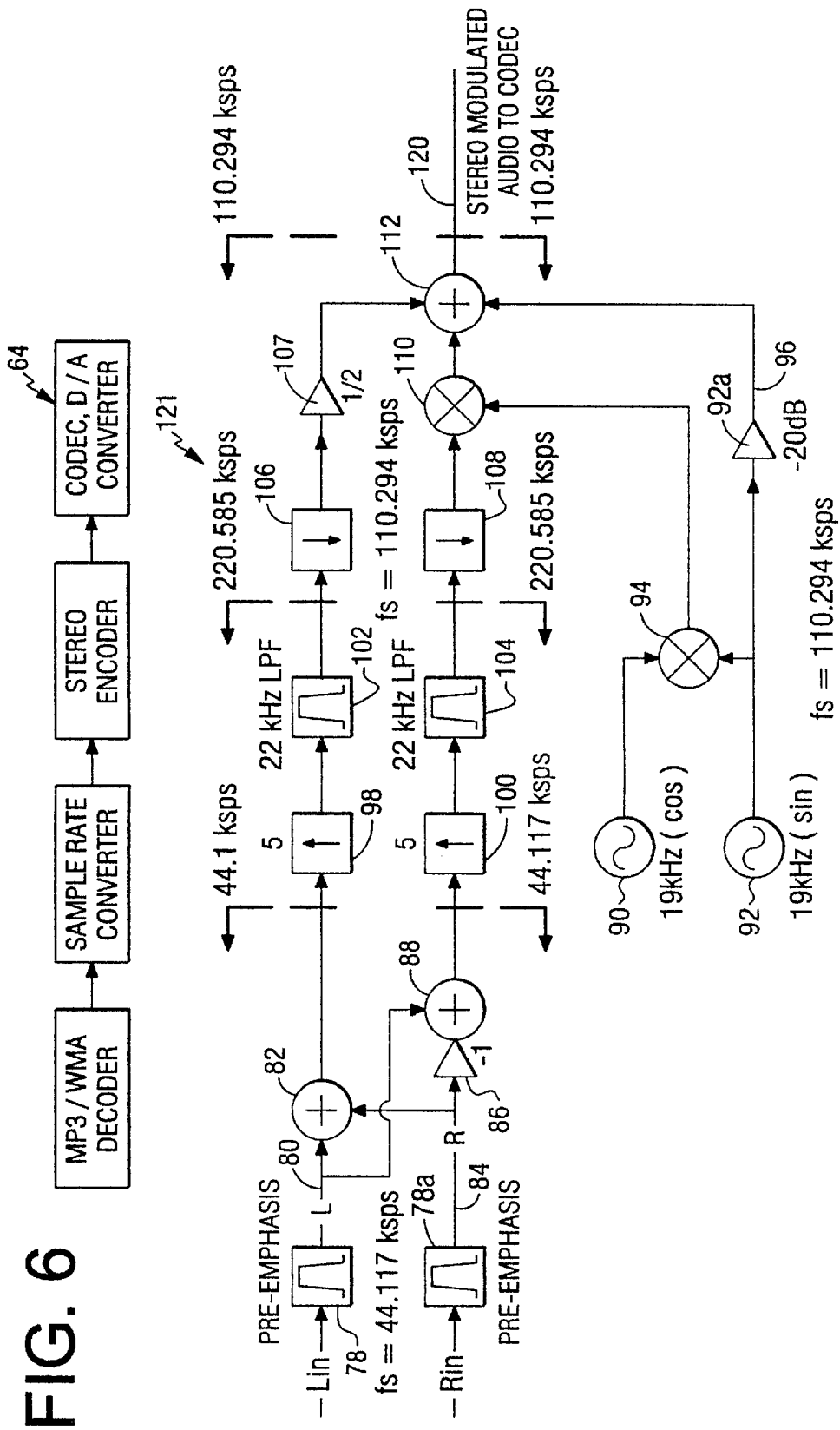
FIG. 6 is a block diagram of the all-digital FM stereo encoder according to the invention showing the signal flow in the player between the MP3/WMA decoder and the CODEC.

The FM stereo encoder which feeds a digital signal from the MP3/WMA decoder to the CODEC according to the invention is shown in FIG. 6. The upper block diagram illustrates the signal flow from the MP3/WMA decoder to the sample rate converter, to the stereo encoder, and to the CODEC/converter 64. Since the CODEC 64 of the system typically operates at a constant sample rate as illustrated in FIG. 5, a sample rate converter is used to up-sample or down-sample the decoded audio to the fixed CODEC rate. While the MP3 audio format supports many sample rates, including but not limited to 22.050 kHz, 48 kHz and 11.025 kHz, the sample rate of the system is set to 44.117kHz.

As further seen in FIG. 6, the pre-emphasis filters 78 and 78a serve to apply a 75 μs pre-emphasis for stereo noise reduction. Further, the filters 78 will band limit the audio to 15 kHz as required by the stereo encoding standard. The left channel signal is fed along line 80 to the summer 82, while the right channel signal is fed along the line 84 to the summer 82 and the −1 gain block 86. The output of the gain block 86 is fed to the summer 88. Further, the left channel signal is fed to the summer 88, while the right channel signal is fed to the summer 82, as above noted. The summers 82 and 88 generate the L+R and L−R signals used in the stereo encoding standard, while the gain block generates the difference between the L and R channels.

Discrete tone oscillators 90 and 92 accurately generate the 19 kHz pilot tone and also create the 38 kHz modulation tone when multiplied together by the multiplier 94. This 38 kHz tone modulates the L−R channel up to a 30 kHz space centered around the 38 kHz tone through the process of double-side band carrier suppressed modulation. Thus, the multiplier 94 creates the modulation tone from an in-phase and quaduature (90 degrees out of phase) signal. Attenuation line 96 for attenuating the signal from the tone oscillator 92 is used as required by the stereo modulation standard, and the pilot tone is used by the receiver to generate a phase-locked 38 kHz local oscillator for demodulating the L−R channel information.

The X5 up-samplers 98 and 100 interleaves every audio sample with four zeros, while the anti-aliasing filters 102 and 104 filter the up-sampled audio signal. Down-samplers 106, 108 pull out every other sample, producing a resultant signal-sampling rate of 110.294 ksps. It should be appreciated that it is important to minimize the intermediate sample rate 121 of 220.585 ksps so as to minimize the process or requirements for the encoder. The ratio of 5/2 is the smallest combination of integer values that can up-sample a 44.117 kHz sampled signal to a sample greater than 108 KHz, the Nyquist rate for digitally representing the stereo modulated signal. The multiplier 110 forms the modulator by taking the L−R channel and modulating it up to the space surrounding the 38 kHz tone that is fed from the multiplier 94. The pilot tone from the oscillator 92 is fed through a −20 dB gain block 92a to the summer 112 for signal attenuation. The L+R signal is modulated by the ½ gain block 107 and fed to the summer 112 along with the modulated L−R signal resulting in the signal stereo MPX (multiplexed signal) that is fed to the CODEC along line 120. It should be appreciated that if additional processor power and a higher speed CODEC were available, a higher sampling rate could be used which will afford higher quality audio reproduction.

Figure 7:
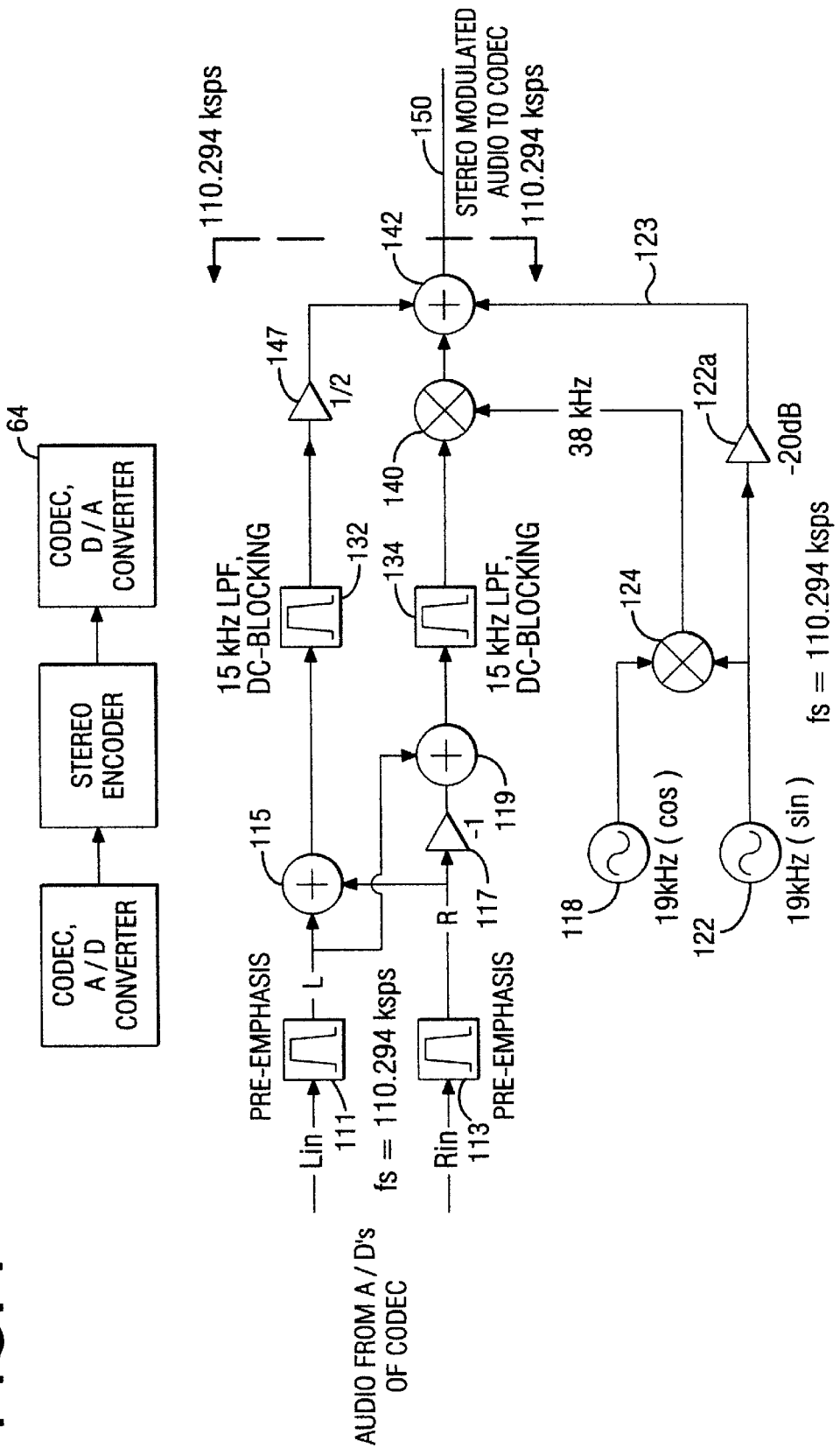
FIG. 7 is a block diagram of a stereo encoder according to the invention for transmitting audio inputted into the WOID player by an external device.

The block diagram of FIG. 7 illustrates the system for inputting stereo audio into the WOID player, such as for loading the MP3/WMA memory storage or to play a CD through the WOID player to be transmitted to an external radio. The upper block diagram shows the signal flows from the CODEC to the stereo encoder and back to the CODEC 64. As previously described, the CODEC 64 of the system operates at a constant sample rate as illustrated in FIG. 5. A sample rate converter is used to up-sample or down-sample the decoded audio to the fixed CODEC rate. The sample rate of the system is set to 110.294 kHz.

The flow chart of FIG. 7, shows a stereo encoder used to receive audio from an external device, such as a stereo CD player or the like, and transmit the audio to a mobile, portable, or stationary receiver. The encoder includes pre-emphasis filters 111 and 113 that receive the stereo audio and serve to apply a 75 μs pre-emphasis signal for stereo noise reduction. Further, the filters 111 and 113 will band limit the audio to 15 kHz as required by the stereo encoding standard. The left channel signal L is fed from filter 111 to the summer 115, while the right channel signal R is fed from filter 113 to the summer 119 through a−1 gain block 117. Further, the left channel signal L is fed to summer 119, as above noted.

The summers 115 and 119 respectively generate the L+R and L−R signals used in the stereo encoding standard, while the gain block 117 generates the difference between the L and R channels.

Discrete tone oscillators 118 and 122, respectively, generate the 19 kHz (cos) and 19 kHz (sin) pilot tones used to create the 38 kHz modulation tone when multiplied together by the multiplier 124. This 38 kHz tone modulates the L−R channel up to a 30 kHz space centered around the 38 kHz tone through the process of double-side band carrier suppressed modulation. Thus, the multiplier 124 creates the modulation tone from an in-phase and quaduature (90 degrees out of phase) signal. The signal along line 123 is attenuated by a−20 dB gain block 122a and used as required by the stereo modulation standard, and the pilot tone is used by the receiver to generate a phase-locked 38 KHz carrier for demodulating the L−R channel information.

The anti-aliasing filters 132 and 134 filter the inputted audio signal. The multiplier 140 forms the modulator by taking the L−R channel and modulating it up to the space surrounding the 38 kHz tone. The pilot tone from the multiplier 124 is fed to the multiplier 140, while the pilot tone from the oscillator 122 is fed through the −20 dB gain block 122a to the summer 142. The summer 142 adds the L+R signal after the signal is modified by the ½ gain block 147, and the modulated L−R signal, and attenuates the 19 kHz pilot tone resulting in the signal stereo MPX (multiplexed signal) that is fed to the CODEC along line 150. It should be appreciated that if additional processor power is available, and a higher speed CODEC, a higher sampling rate can be used which will afford higher quality audio.

Stereo FM transmission usually has a lower signal to noise ratio (SNR) than monaural FM transmission. Incorporated into this WOID player is a system that automatically switches the resultant audio from pure stereo transmission to pure monaural transmission based on an estimate of the energy of the transmitted audio. During pure stereo when the SNR is most weak, the noise distortion is most noticeable during periods of silence or lower volume levels. The present device automatically switches from stereo to monaural transmission during such periods. This significantly reduces that amount of noise heard during these lower volume levels, or silence.

Figure 8:
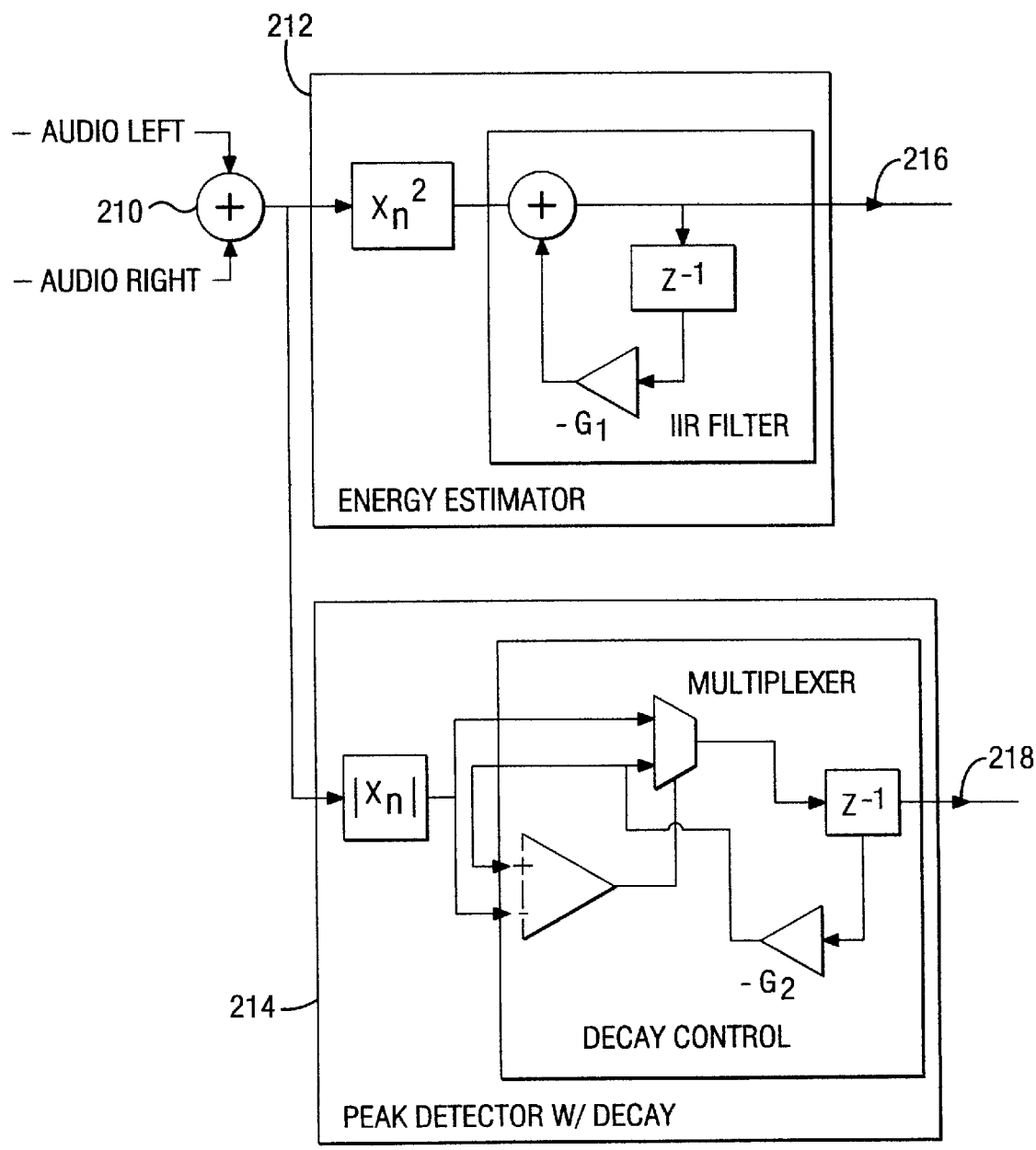
FIG. 8 is a block diagram of methodology of measuring the energy and peak estimators for determining the channel having the least interference.

Referring now to FIG. 8, a block diagram is shown of the processing methodology of a channel signal to determine the energy and peak estimators and the ultimate energy of the signal for understanding the occupancy of a channel in order to designate the channel with the least interference for use in FM transmission. This function is accomplished in the DSP.

The left and right channels of a stereo channel frequency are received by the summer 210 and the summed signal is delivered to the upper block 212 and the lower block 214. The upper block 212 processes the signal to obtain an estimate of the energy of the signal, while the lower block 214 processes the signal to obtain an average estimate of the signal peak. In the upper block 212 the signal is squared and fed through an IIR filter which processing provides an estimate of the energy level of the signal on an average basis that is fed to an output line 216. The lower block 214 receives the signal and feeds it through a peak detector with a decay control to obtain an average estimate of the peak value of the signal that is fed to an output line 218. The output lines are fed to a processor for processing the energy and peak values of the channels. The estimated peak of the signal will always be higher than the estimated energy.

The energy and peak signals are processed to obtain a pea-to-energy profile or ratio of the channel frequency signal. This processing is done for each channel and the profiles with the lowest peak-to-energy ratios are first isolated. From those profiles the one profile having the least energy is taken and considered to be the channel with the least interference. Thus, the method of measuring and recording for processing of the metrics of channel occupancy is shown in FIG. 8.

Figure 9:
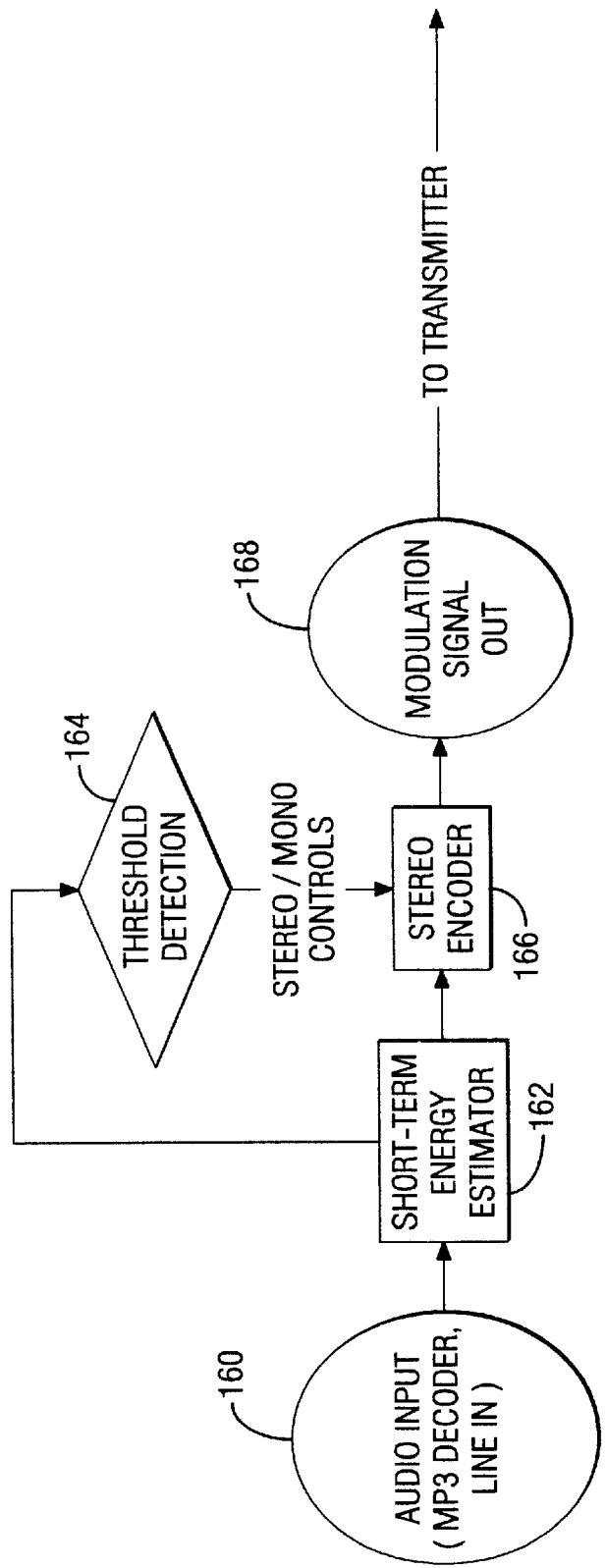
FIG. 9 is a flow chart of the auto-noise reduction system of the present invention.

As illustrated in the flow chart of FIG. 9, the DSP of the wireless output input device player accepts an audio input at block 160 and feeds this input to a short term energy estimator at block 162 of the type shown in FIG. 8. The estimator receives the audio input and quantifies the quality of the intended stationary or mobile receiver. The estimator determines if there is a quality problem with the stereo feed and sends this information to the stereo encoder at block 166. The estimator contains a threshold detection block 164 which quantifies the amount of interference needed to alter transmission from stereo to monaural. The encoder 166 determines if the threshold for stereo interference is greater than the SNR of a monaural broadcast. If the interference is greater by transmitting in stereo mode than with monaural transmission, the modulation signal is automatically changed monaurally. Thus, whichever signal has the least SNR goes to the modulation signal out block 168 and then to the transmitter. By using this information, the unit will automatically switch to monaural broadcasting or switch back to stereo FM broadcasting without the user having to intervene, thus giving the best FM transmission at all times. When switching to monaural, the tone generators are turned off.

Inasmuch as the player of the invention includes an FM transmitter and must be configured in compliance with FCC regulations, as above noted the transmission power of the FM transmitter must be very low to avoid interference with other electronics, thereby limiting the range of transmission. Normally, the player will be placed in close proximity to the driver of a vehicle when used in a mobile manner, and therefore the location of the player may be some distance from the vehicle's radio antenna. In such a situation, since the power of the FM transmitter is quite low, it may not be possible to effectively use the player to transmit to the FM receiver of the vehicle. This problem is overcome where the above-mentioned remote control is used for controlling the operation of the player, as the player could then be placed in closer proximity to the antenna, and the user could control the player with the remote control.

Another solution to the problem would be to provide an external antenna suitably connected to an antenna jack on the player which could be placed in close proximity to the vehicle's antenna. Thus, while traveling in congested urban areas with a large number of radio stations in a vehicle having the antenna located significantly toward the rear of the vehicle, use of an external antenna for the player positioned near the antenna for the vehicle will substantially improve the performance of the player.

Accordingly, it will be appreciated that an antenna can be connected to the player with the appropriate shielded cable and the user can place that antenna in proximity to the antenna of the vehicle. Moreover, where a cigarette lighter socket would be used to provide power for the player, the antenna could be connected to the cigarette lighter mount and then placed in proximity to the automobile antenna. Performance can thereby be maintained at the highest possible level.

The operation of the WOID player in a vehicle would require manipulation by the user to connect the power to the vehicle power, such as by use of the cigarette lighter adapter, and power up the player. The player will automatically determine the channel of least interference and automatically tune the FM transmitter to that channel, and indicate the channel frequency in the display and audibly cue the user. The player could accomplish this either by choosing from preset frequencies as illustrated by FIG. 10, or by continually monitoring all FM frequencies as illustrated by FIG. 11.

Figure 10:
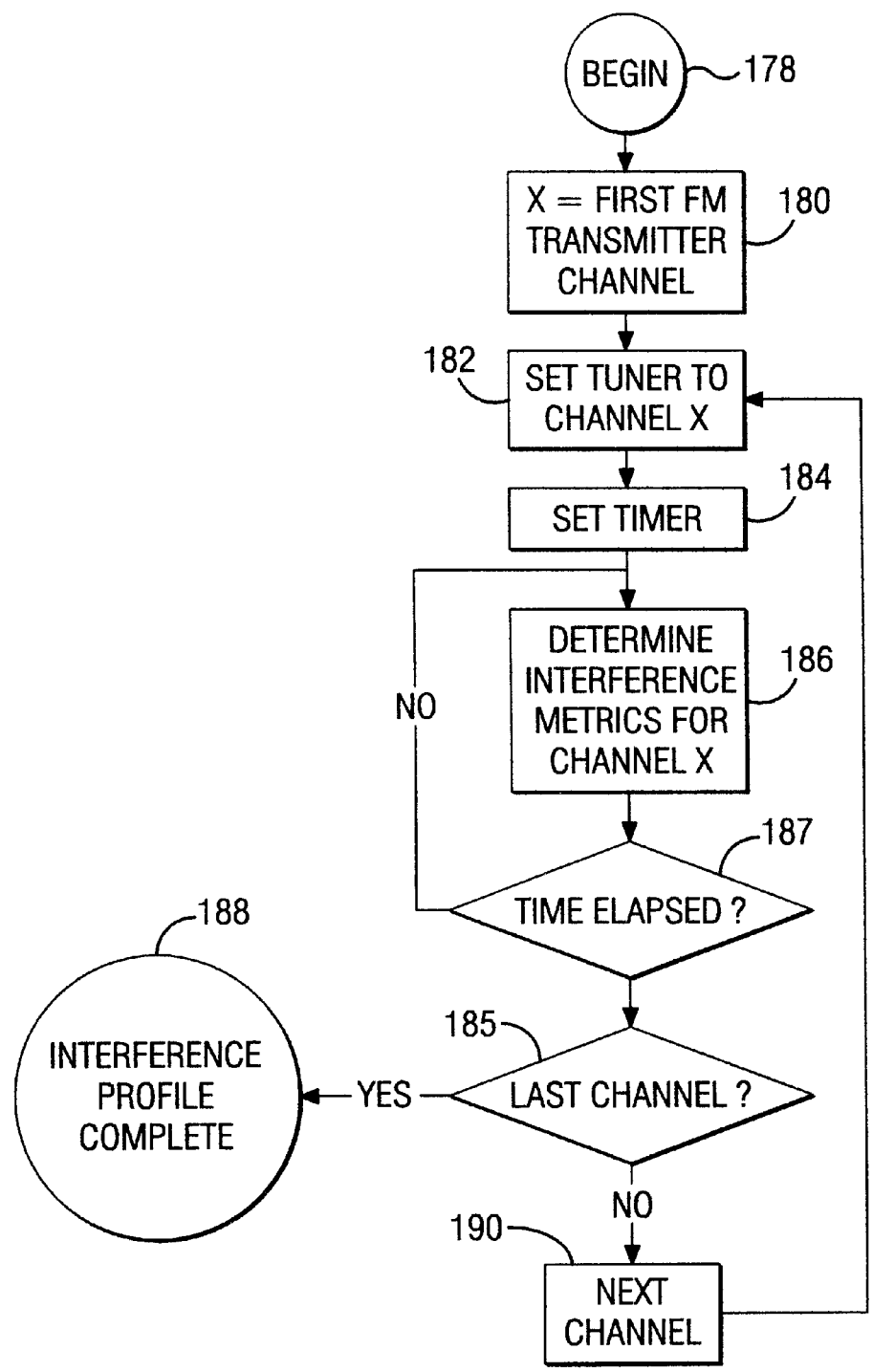
FIG. 10 is a flow chart showing the channel interference profile of the present invention.

Referring to the flow chart of FIG. 10, the process in the DSP for providing interference profiles of the channels commences at block 178 by displaying a first FM transmit frequency x at block 180. The user will then set the tuner of the mobile, portable, or stationary receiver to the FM transmit frequency channel X at block 182. The timer 184 functions to allow the estimators in block 186 to check the current channel for the current channel. If after a specified time period at block 187, the time given for analysis has elapsed, the player sequentially analyzes the next frequency until the last channel at block 185 is reached. The system is optimally set up to scan a pre-determined amount of frequencies, and will continue to scan all the predetermined frequencies. If the last channel has not been checked, the process goes to the next channel block 190. After the last channel 185 of the predetermined frequencies has been scanned, the interference profiles for all the scanned frequencies are reviewed at block 188, and the player can now determine by processing the channel signals according to the methodology above explained for FIG. 8 as to which of the preset searched channel frequencies has the least amount of interference and if one or more channels have a predetermined lesser interference than the set channel X. Then, the player will cue the user as to the frequency of the channel determined to have the least interference.

Figure 11:
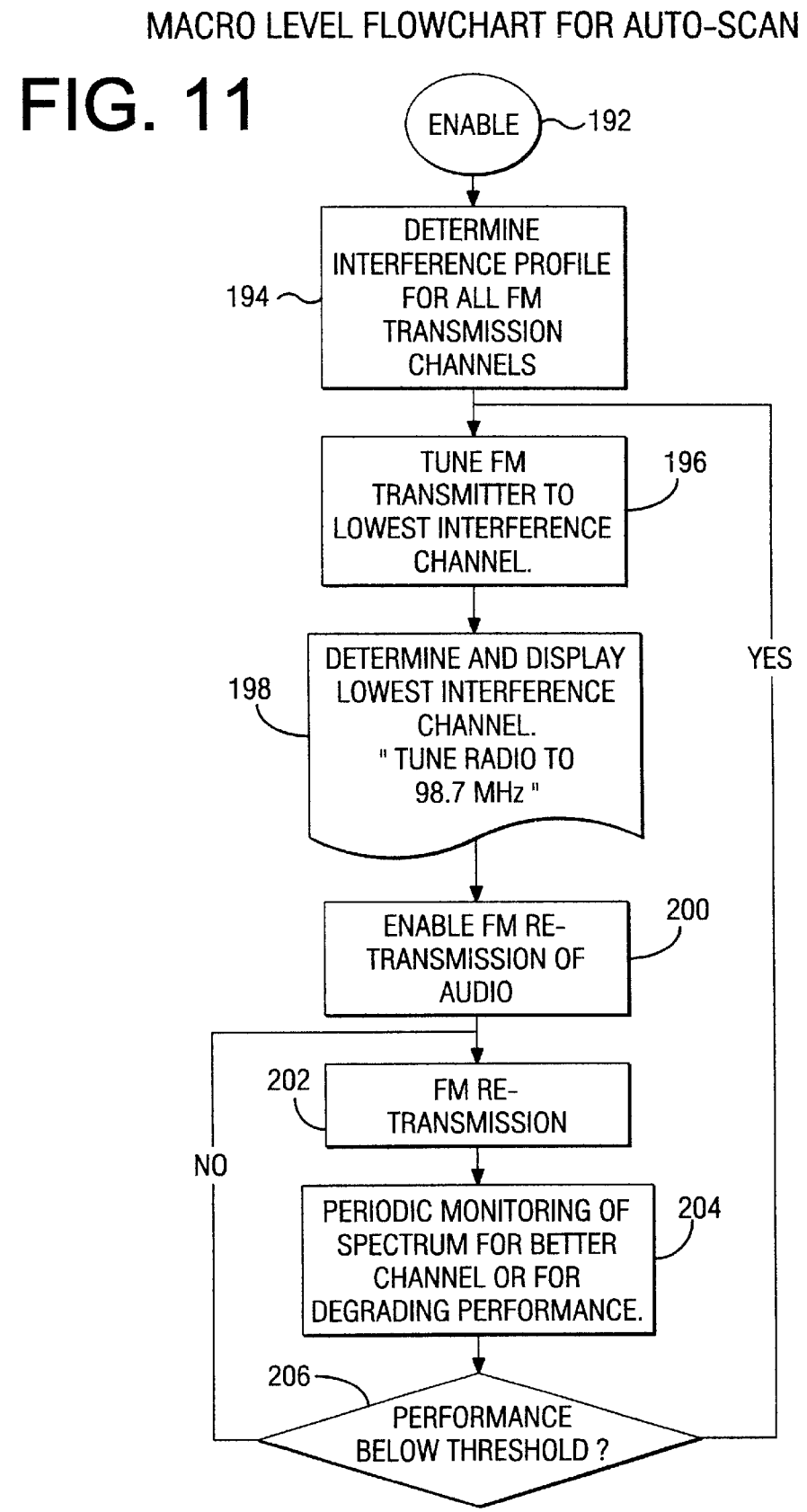
FIG. 11 is a flow chart of the auto-scanning feature of the present invention.

The flow chart of FIG. 11 further illustrates the auto-scanning feature for all FM channels according to the invention as processed by the DSP. After the player has been enabled to auto-scan in block 192, the player searches all FM transmission channel frequencies and determines the interference profile for these FM transmission channels at block 194 by the process illustrated in FIG. 8 and described above. After the player has scanned all the FM channels, the integrated FM transmitter is then tuned to the lowest interference channel at block 196. Upon determining the frequency with the lowest interference channel, the player will cue the user and indicate the lowest interference channel at block 198 to which the radio should be tuned. For example, the display will show the user to "Tune radio to 98.7 MHZ." When the user has tuned the mobile or stationary radio to the displayed frequency, the player will automatically enable FM re-transmission of the audio at block 200, and begin FM transmission at the selected channel at block 202.

During re-transmission at block 202 to the mobile or stationary receiver, the player will periodically monitor the FM spectrum at block 204 for a better frequency or for determination of degraded audio performance, by using one of the techniques above described. If the player determines that performance is below the threshold 206, a signal will be sent to the interference profile block 194 and the player will automatically initiate the interference profile determination procedure, and begin the cycle of finding the lowest interference channel for retuning the transmitter at block 196 and displaying the channel at the display at block 198.

From the foregoing, it will be appreciated the WOID player of the invention facilitates the transferring of audio, such as music or the like, from an internal or external MP3/WMA or other digital source to a mobile, portable, or stationary RF receiver to provide high quality listening such audio.

It will be understood that modifications and variations may be effected without departing from the scope of the novel concepts of the present invention, but it is understood that this application is to be limited only by the scope of the appended claims.

The invention is hereby claimed as follows:

1. A wireless output input device player for storing and/or receiving audio and relaying an analog frequency modulated radio frequency signal from a digital audio source to an external FM receiver capable of receiving a plurality of channel frequencies, said player comprising:

an integrated FM transmitter, an integrated FM receiver having a stereo audio output, processing means for digitally decoding audio from said digital audio source and to digitally stereo encode audio to preserve the digital stream prior to stereo modulation at the FM transmitter, means for converting the digital output of the processing means to an analog signal and relaying the signal to the FM transmitter for transmission to said external receiver, means for scanning the channel frequencies of the FM receiver for a channel frequency having the least interference, means for automatically tuning the FM transmitter to said channel frequency, and means for indicating said channel frequency of least interference on said player, whereby the external FM receiver may be tuned to said channel frequency for receiving the output of the transmitter.

2. The wireless output input device player of claim 1, wherein said transmitter transmits an FM signal and said external receiver operates in the FM spectrum.

3. The player of claim 2, which further includes means for frequency synthesizing said integrated FM transmitter and said integrated FM receiver.

4. The player of claim 2, wherein said means for scanning includes means for monitoring the audio of the integrated FM receiver for static noise to determine the FM channel having the least amount of interference.

5. The device of claim 4, wherein said means for indicating includes means for producing an audio cue in the event a better FM channel is found.

6. The device of claim 4, wherein said means for indicating includes means for producing a visual cue in the event an FM channel of lesser interference is found.

7. The device of claim 2, wherein said player can automatically switch FM transmission from monaural to stereo when audio performance is optimal.

8. The player of claim 1, wherein said means for scanning includes a digital signal processor for evaluating the peak to energy ratios and energy levels of the channel frequencies.

9. The player of claim 1, wherein said player further includes means for producing an audio and/or a visual cue in the event an FM channel frequency with less interference is found.

10. The player of claim 1, wherein said player further includes means for transmitting the digital data over the FM band.

11. A wireless output input device player for relaying a digitally synthesized analog frequency modulated radio frequency signal to an external FM receiver, said player comprising:

a digital storage device having means to decode compressed audio using a processor, said processor having adequate processor power to provide necessary filtering, up sampling, modulation, pilot tone and sub-carrier generation for stereophonic signal generation, an integrated FM transmitter for modulating the digitally encoded stereo or monaural output of the storage device to said external receiver, said player having means for digitally stereo encoding audio to preserve the digital stream prior to stereo modulation at the FM transmitter, and a digital frequency synthesizer under control of said processor providing FM broadcast band coverage.

12. The player of claim 11, which further includes an integrated FM receiver, and a wireless remote control operable to transmit control signals to said integrated FM receiver to control operation of said player.

13. The player of claim 12 wherein said remote control includes a low power CPLD driven by a watch crystal to provide periodic wake-up and transmit functions, a power controlled FM VCO, and means for programming the CPLD.

14. The player of claim 13, wherein said watch crystal is 32.768 kHz.

15. The combination of claim 13, wherein means is provided to phase lock the VCO to said crystal.

16. The player of claim 11, which further includes means for transmitting and receiving digital data over the FM band.

17. The player of claim 11, which tuber includes a wireless remote control for sending data to the player using the synthesizer to control operation of the player.

18. The player of claim 11, which further includes means for automatically switching between stereo transmission and monaural transmission upon detecting a predetermined lower volume level or silence of the transmitted audio.

19. A wireless output input device player for relaying a digitally synthesized analog frequency modulated radio frequency signal to an external FM receiver, said player comprising:

a digital storage device having means to decode compressed audio using a processor, said processor having adequate processor power to provide necessary filtering, up sampling, modulation, pilot tone and sub-carrier generation for stereophonic signal generation, an integrated FM transmitter for modulating the digitally encoded stereo or monaural output of the storage device to said external receiver, said player having means for digitally stereo encoding audio to preserve the digital stream prior to stereo modulation at the FM transmitter, and a digital frequency synthesizer providing FM broadcast band coverage.

20. A wireless output input device player for relaying a digitally synthesized analog frequency modulated radio frequency signal to an external FM receiver, said player comprising:

a digital storage device having means to decode compressed audio using a processor, said processor having adequate processor power to provide necessary filtering, up sampling, modulation, pilot tone and sub-carrier generation for stereophonic signal generation, said sampling having a sample rate conversion of 5/2 that is used to up-sample the audio from 44.117 kHz to 110.294 kHz, an integrated FM transmitter for modulating the digitally encoded stereo or monaural output of the storage device to said external receiver, and a digital frequency synthesizer under control of said processor providing FM broadcast band coverage.

* * * * *